(12) United States Patent
Chau

(10) Patent No.: US 8,515,207 B2
(45) Date of Patent: Aug. 20, 2013

(54) ANNOTATIONS IN PANORAMIC IMAGES, AND APPLICATIONS THEREOF

(75) Inventor: Stephen Chau, San Francisco, CA (US)

(73) Assignee: Google Inc., Mountain View, CA (US)

(*) Notice: Subject to any disclaimer, the term of this patent is extended or adjusted under 35 U.S.C. 154(b) by 918 days.

(21) Appl. No.: 11/754,265

(22) Filed: May 25, 2007

(65) Prior Publication Data
US 2008/0292213 A1 Nov. 27, 2008

(51) Int. Cl.
*G06K 9/32* (2006.01)
(52) U.S. Cl.
USPC ........... 382/294; 382/133; 382/103; 382/154; 382/157; 382/201; 382/216; 382/296; 345/419; 345/619; 345/649; 345/650; 345/653; 33/320; 701/408; 701/409; 701/437; 701/438; 701/445; 701/446; 701/454; 701/460; 701/520; 700/56; 700/57; 700/60; 700/61; 700/62; 700/64; 700/66
(58) Field of Classification Search
USPC ................. 382/294, 133, 103, 154, 157, 201, 382/216, 296; 345/419, 619, 649, 650, 653; 701/408, 409, 437, 438, 445, 446, 454, 460, 701/520; 700/56, 57, 60, 61, 62, 64, 66
See application file for complete search history.

(56) References Cited

U.S. PATENT DOCUMENTS

| | | | |
|---|---|---|---|
| 6,097,393 A | 8/2000 | Prouty, IV et al. | |
| 6,346,938 B1 | 2/2002 | Chan et al. | |
| 6,563,529 B1 | 5/2003 | Jongerius | |
| 7,096,428 B2 | 8/2006 | Foote et al. | |
| 7,158,878 B2 | 1/2007 | Rasmussen et al. | |
| 7,424,133 B2 | 9/2008 | Schultz et al. | |
| 7,787,659 B2 | 8/2010 | Schultz et al. | |
| 2001/0033283 A1* | 10/2001 | Liang et al. | 345/424 |
| 2006/0074549 A1 | 4/2006 | Takahashi et al. | |
| 2008/0089558 A1* | 4/2008 | Vadon et al. | 382/113 |

FOREIGN PATENT DOCUMENTS
EP 1 426 904 A 6/2004

OTHER PUBLICATIONS

Chen, Shenchang Eric, "QucikTime® VR—An Image-Based Approach to Virtual Environment Navigation," Apple Computer, Inc., Computer Graphics Proceedings, Annual Conference Series, Aug. 6, 1995, pp. 29-38.
EP Patent Office, Partial International Search Report, International Appln. No. PCT/US2008/006683, date of mailing: Nov. 7, 2008, 7 pages.
Kimber, et al.; "FlyAbout: Spatially Indexed Panoramic Video," *Proceedings of the ninth ACM international conference on Multimedia* ; pp. 339-347; 2001.
Pegoraro, Rob. "Mapping That Puts You There"; The Washington Post; May 31, 2007; p. D1. 2 pages.

(Continued)

*Primary Examiner* — David Zarka
*Assistant Examiner* — Mark Roz
(74) *Attorney, Agent, or Firm* — Sterne, Kessler, Goldstein & Fox PLLC

(57) ABSTRACT

A technique for efficient processing of annotations in images such as panoramic images is herein disclosed. In an embodiment, a first user annotation is received for a feature in a first panorama, and a second user annotation for the same feature is received in a second panorama. The coordinates for the feature can then be generated by computing the intersection between data generated for the first user annotation and for the second user annotations.

6 Claims, 11 Drawing Sheets

(56) References Cited

OTHER PUBLICATIONS

Darken, R. and Cevik, H., "Map Usage in Virtual Environments: Orientation Issues," *Proceedings of the IEEE Virtual Reality Conference*, pp. 133-140, IEEE, 1999.

Dykes, J. et al., "Virtual environments for student fieldwork using networked components," *International Journal of Geographical Information Science*, vol. 13, No. 4, pp. 397-416, Taylor & Francis Ltd., 1999.

Murphy, D. W. et al., *Air-Mobile Ground Surveillance and Security System* (AMGSSS) *Project Summary Report*, Technical Document 2914, Defense Special Weapons Agency (DSWA) and Physical Security Equipment Management Office (PSEMCO), 80 pages, Sep. 1996.

Nguyen, H. G. et al., "Virtual Systems: Aspects of the Air-Mobile Ground Security and Surveillance System Prototype," *Unmanned Systems*, vol. 14, No. 1, 11 pages, Winter 1996.

Wei, S. et al., "Color Anaglyphs for Panorama Visulizations", *Communication and Information Technology Research Technical Report (*"CITR-TR"*)*, No. 19, pp. 2-15, Feb. 1998.

\* cited by examiner

```
<?XML VERSION="1.0" ENCODING="UTF-8" ?>
<PANORAMA>

<DATA_PROPERTIES IMAGE_WIDTH="17276" IMAGE_HEIGHT="3596"
TILE_WIDTH="512" TILE_HEIGHT="512"

PANO_ID="PANO=0x12345678" NUM_ZOOM_LEVELS="3"

LAT="3.780433" LNG="-122.433800">

<COPYRIGHT>©2007 GOOGLE</COPYRIGHT>
<TEXT>MAIN STREET</TEXT>
<STREET_RANGE>1100-1200</STREET_RANGE> </DATA_PROPERTIES>

<PROJECTION_PROPERTIES VERTICAL_SCALE="1.0" PANO_YAW_DEG="0.0"
TILT_YAW_DEG="0.0" TILT_PITCH_DEG="0.0" />

<ANNOTATION_PROPERTIES HORIZON_HEIGHT_FRACTION="0.5"
ANNOTATIONS_HEIGHT_FRACTION="0.75">

<PANO_LINK YAW_DEG="0.0" PANO_ID="PANO=0x9876543">

<LINK_TEXT>MARKET ST</LINK_TEXT>

</PANO_LINK>

<PANO_LINK YAW_DEG="90.0" PANO_ID="PANO=0x4389299">

<LINK_TEXT>ELM ST</LINK_TEXT>

</PANO_LINK>
</ANNOTATION_PROPERTIES>
</PANORAMA>
```

FIG.5

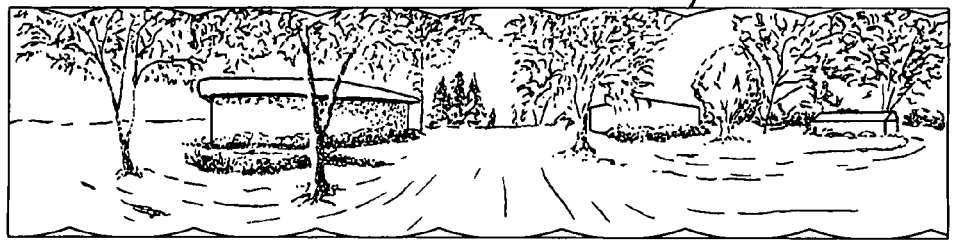

FIG.6

ANNOTATIONS IN PANORAMIC IMAGES, AND APPLICATIONS THEREOF

FIELD OF THE INVENTION

The present invention generally relates to displaying imagery, and more particularly to processing annotations in panoramic images, and applications thereof.

BACKGROUND

Computerized methods for displaying imagery, in particular panorama imagery, are known. In the context of geographic information systems and digital mapping systems, there are systems such as Google Earth and Google Maps which allow a user to provide their own content and to annotate a map. This, for example, can be accomplished through the use of the Keyhold Markup Language (KML).

BRIEF SUMMARY OF THE INVENTION

The present invention provides for efficient processing of annotations in images such as panoramic images, and applications thereof. In an embodiment, a first user annotation is received for a feature in a first panorama, and a second user annotation for the same feature is received in a second panorama. The coordinates for the feature can then be generated by computing the intersection between data generated for the first user annotation and for the second user annotations. For example, based on the known position of the panorama cameras in both the first and second panoramas and the known directional coordinate of the user annotations with respect to the panoramas, it is possible to compute an intersection of a line or ray from each panorama to the feature to be annotated, the intersection defining the coordinates of the feature.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and to use the invention.

FIG. 5 depicts exemplary Extensible Markup Language (XML) configuration information.

FIG. 6 illustrates an example of a panoramic image.

Figure 7A:
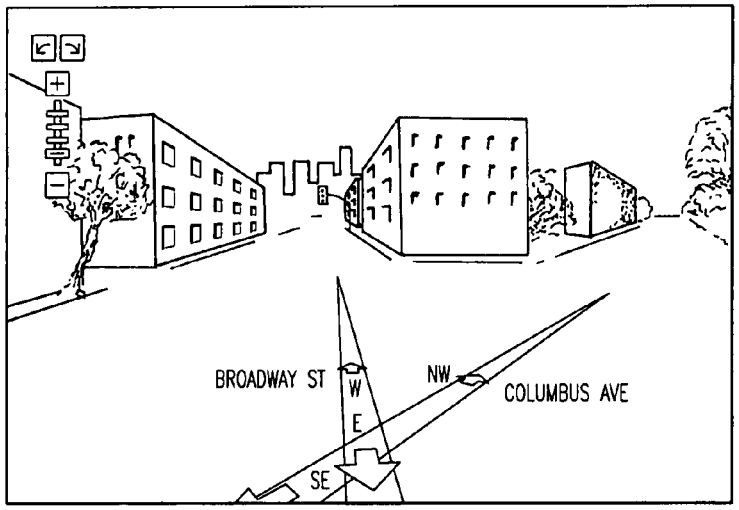
Figure 7B:
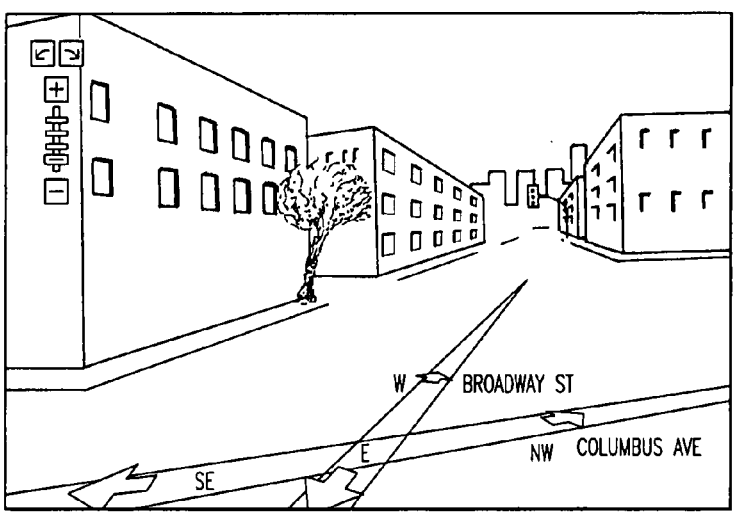
Figure 7C:
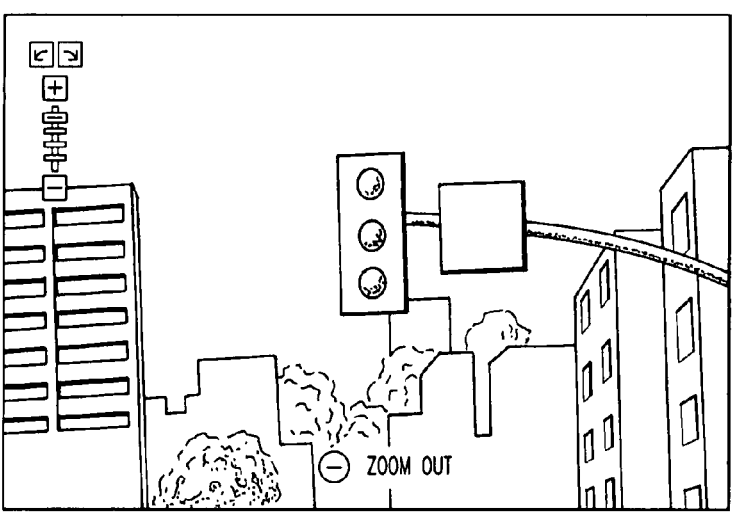

FIGS. 7A, 7B, and 7C illustrate user interaction with the panorama viewer viewport.

Figure 8:
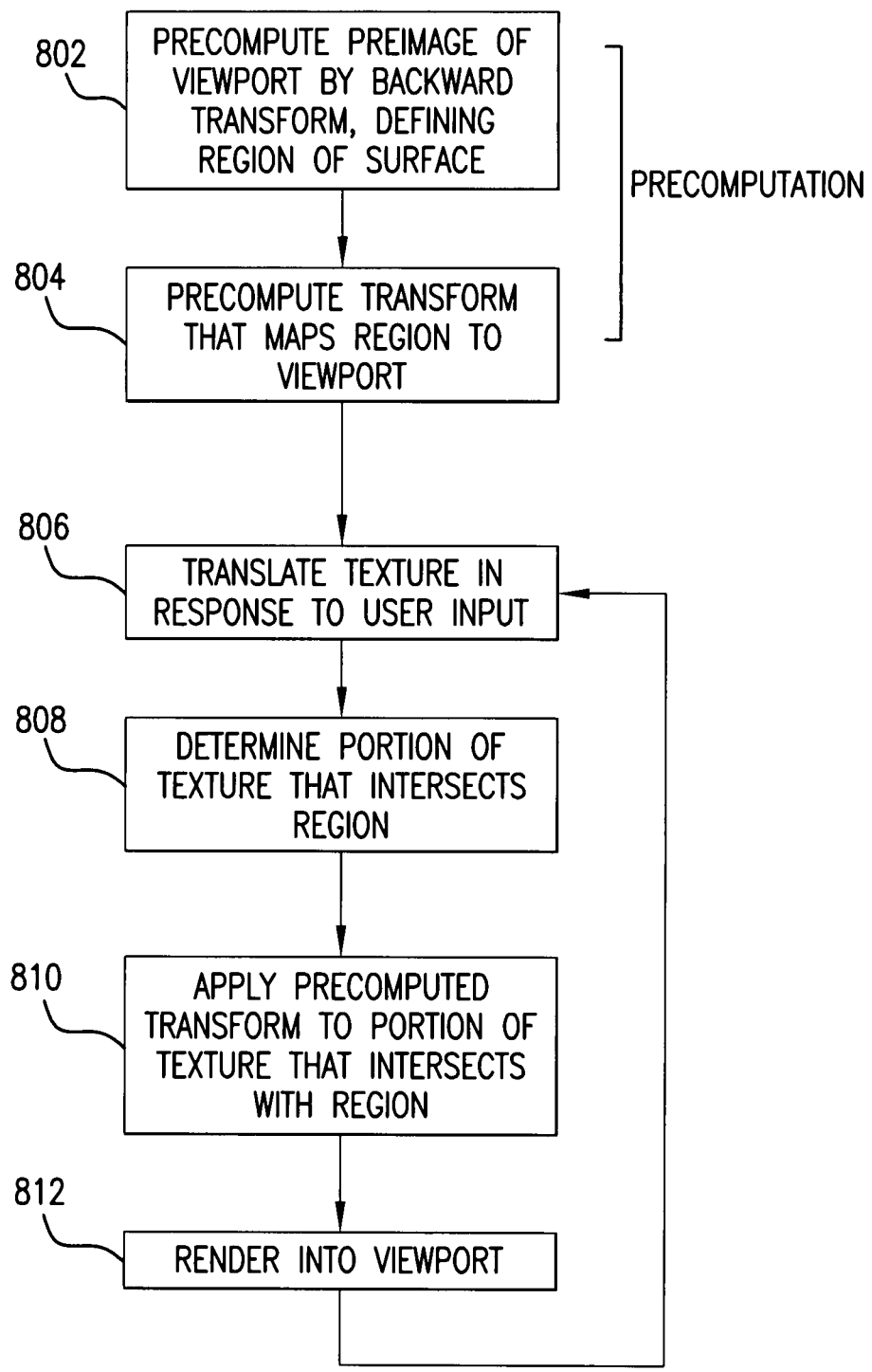

FIG. 8 is a flowchart of processing performed by a renderer, in accordance with an embodiment.

Figure 9A:
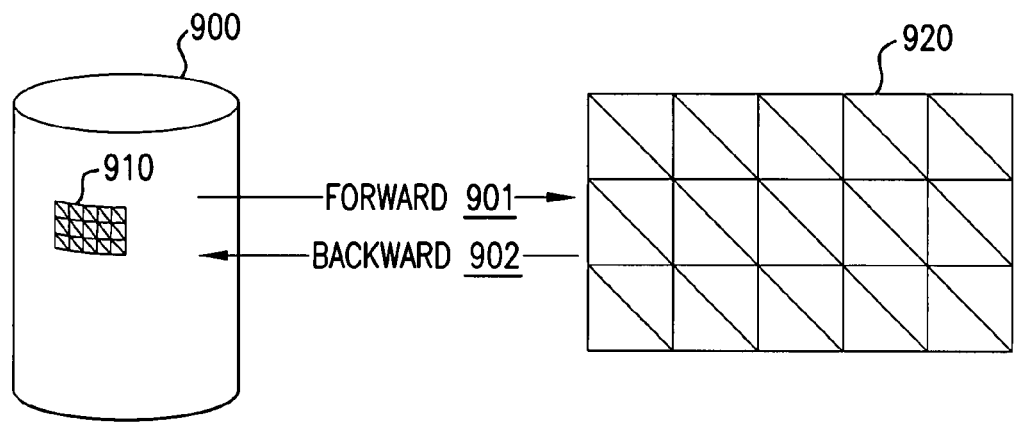
Figure 9B:
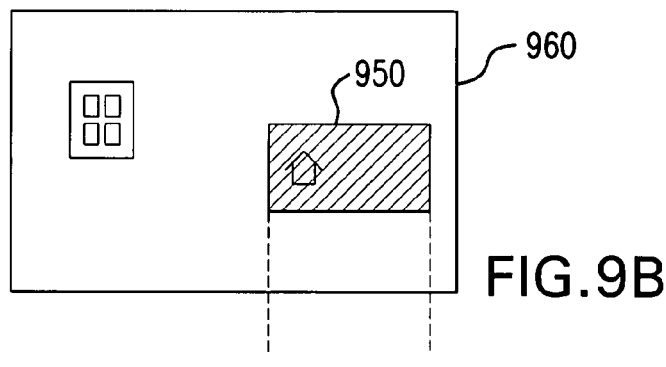
Figure 9C:
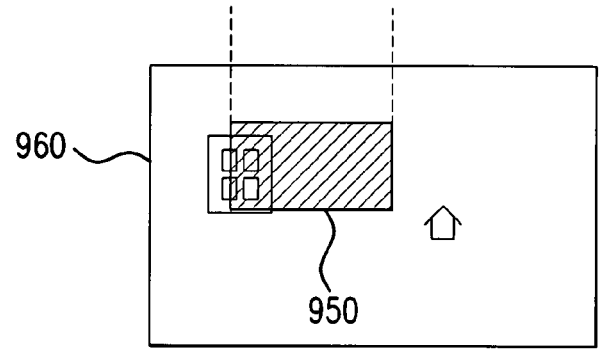

FIGS. 9A, 9B, and 9C illustrate a relationship between a surface, a precomputed region, and a viewport.

Figure 10A:
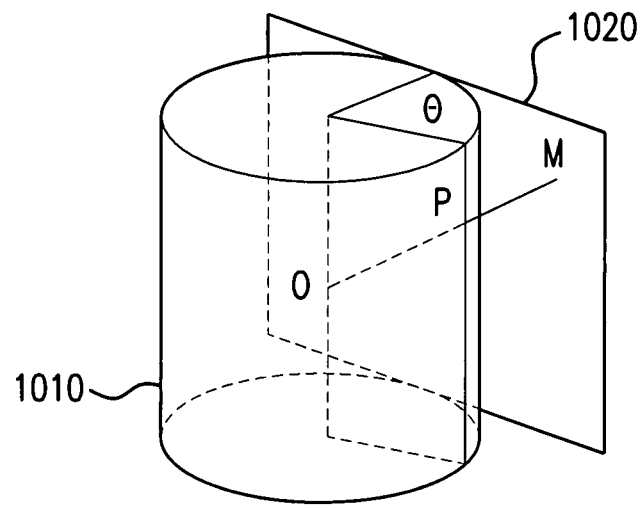
Figure 10B:
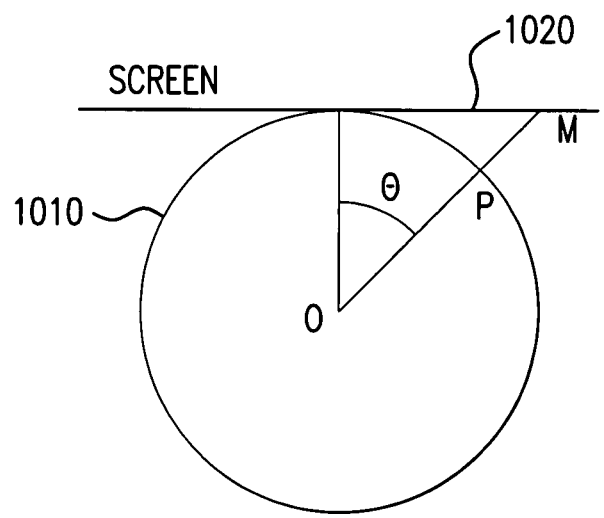

FIGS. 10A and 10B illustrate a simple example of generating transformation parameters.

Figure 11:
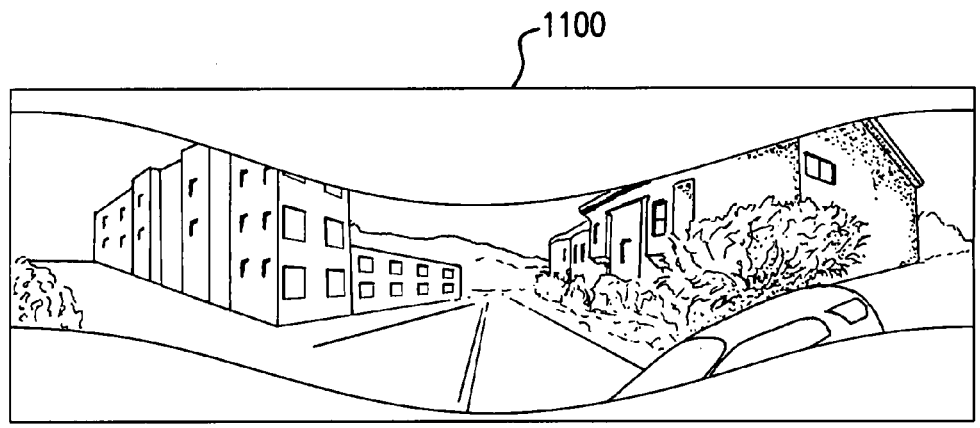

FIG. 11 depicts a panorama which has been warped, in accordance with an embodiment of the invention.

Figure 12:
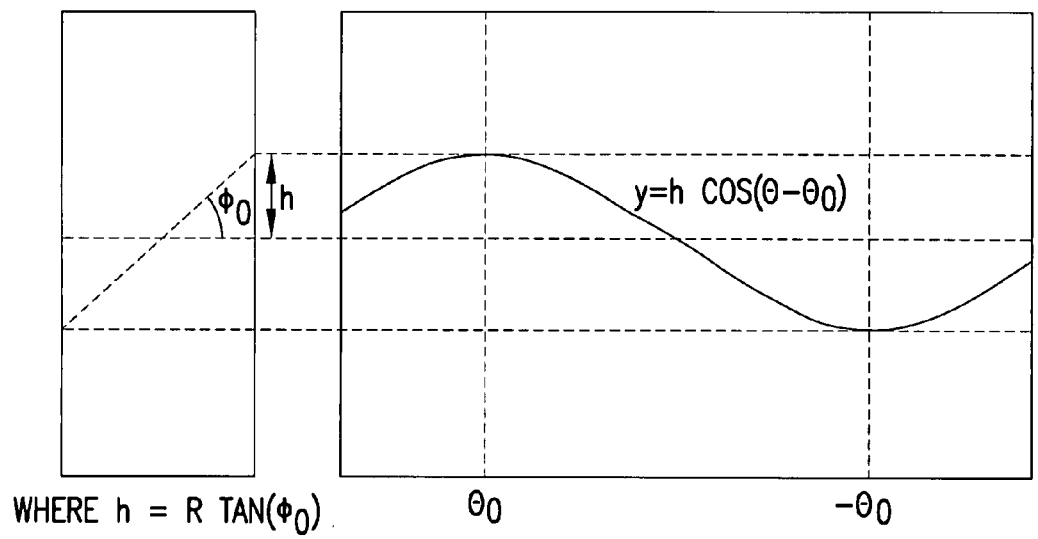

FIG. 12 depicts an exemplary transformation based on yaw and pitch for forming the panorama of FIG. 11.

Figure 13:
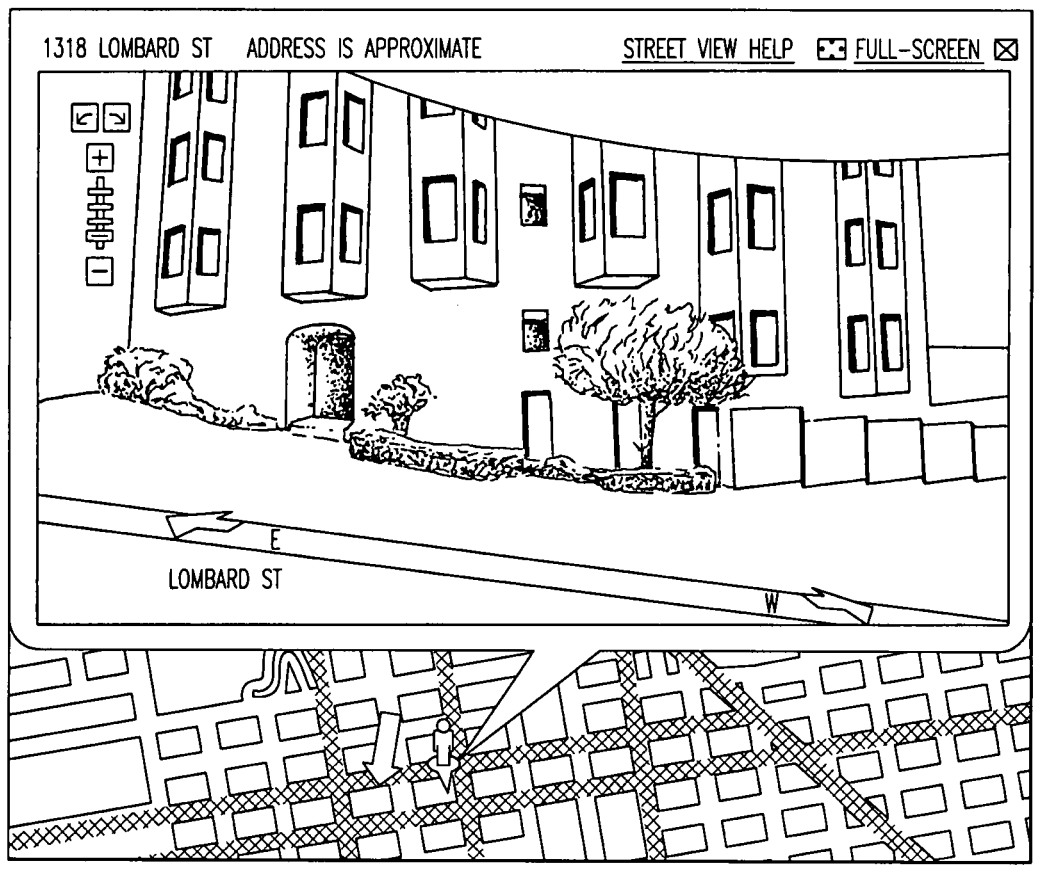

FIG. 13 depicts an exemplary panorama image displayed in accordance with an embodiment of the invention.

Figure 14:
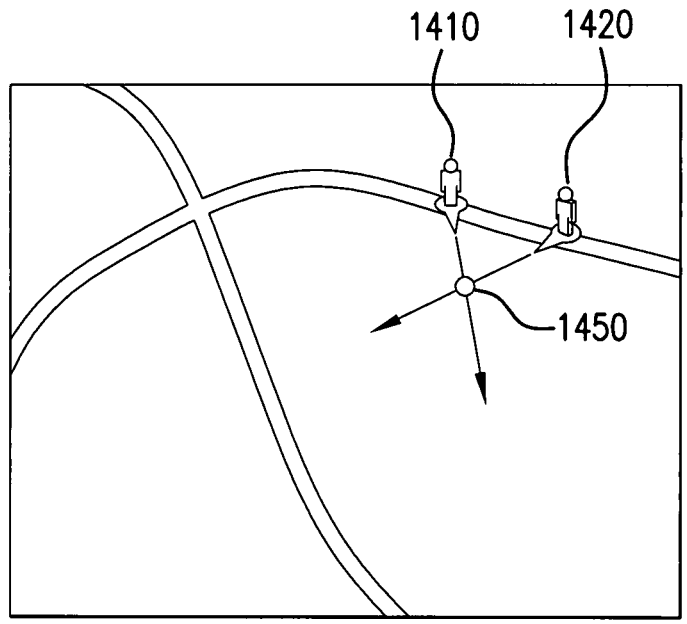

FIG. 14 is a diagram illustrating how to generate coordinates for a user annotation, in accordance with an embodiment.

Figure 15:
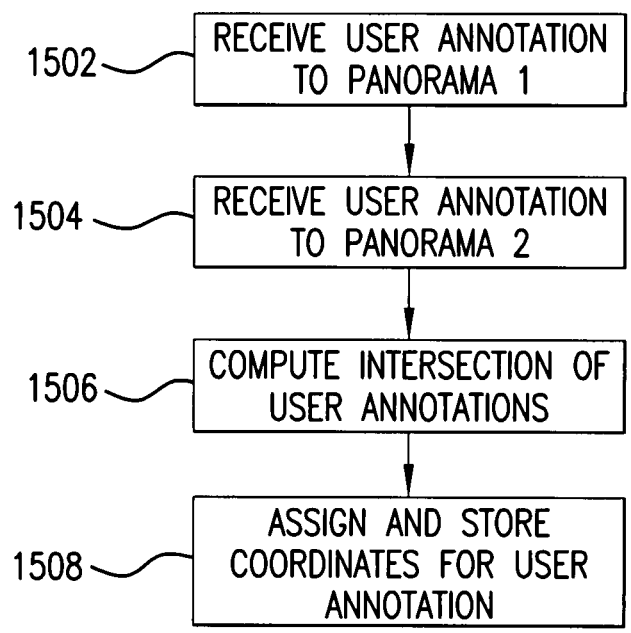

FIG. 15 is a flowchart of processing performed in the generation of user annotation coordinates, in accordance with an embodiment.

The present invention is described with reference to the accompanying drawings. The drawing in which an element first appears is typically indicated by the leftmost digit or digits in the corresponding reference number.

DETAILED DESCRIPTION OF THE INVENTION

The present invention provides for processing annotations in panoramic images, and applications thereof. In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
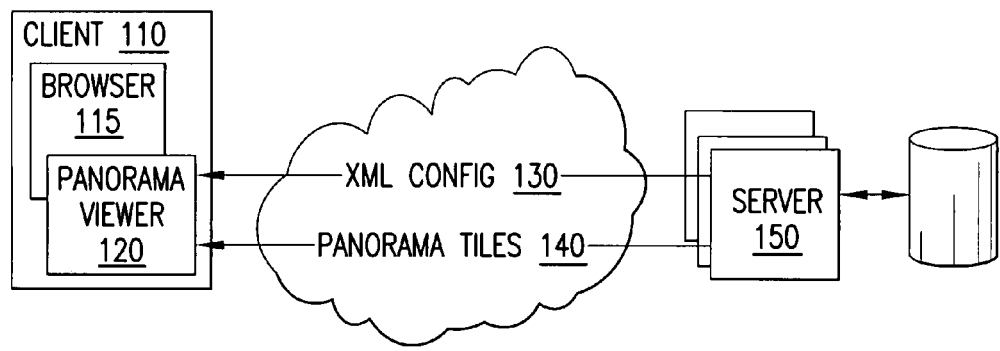
FIG. 1 is a diagram of an exemplary distributed system suitable for practicing an embodiment.

FIG. 1 is a distributed system suitable for practice of an embodiment of the invention. A client 110 communicates with one or more servers 150, for example, across a network such as the Internet or a local area network. Client 110 can be a general-purpose computer with a processor, local memory, a display, and one or more input devices such as a keyboard or a mouse. Alternatively, client 110 can be a specialized computing device such as, for example, a mobile handset. Server(s) 150, similarly, can be implemented using any general-purpose computer capable of serving data to client 110.

Client 110 executes a panorama viewer 120, the operation of which is further described herein.

As illustrated by FIG. 1, panorama viewer 120 requests configuration information 130 from server(s) 150. As discussed in further detail herein, the configuration information includes meta-information about a panorama to be loaded, including information on links within the panorama to other panoramas. In an embodiment, the configuration information is presented in a form such as the Extensible Markup Language (XML). Panorama viewer 120 retrieves visual assets 140 for the panorama, for example, in the form of panoramic images or in the form of panoramic image tiles. In another embodiment, the visual assets include the configuration information in the relevant file format. Panorama viewer 120 presents a visual representation on the client display of the panorama and additional user interface elements, as generated from configuration information 130 and visual assets 140, as further described herein. As a user interacts with an input device to manipulate the visual representation of the panorama, panorama viewer 120 updates the visual representation and proceeds to download additional configuration information and visual assets as needed.

In an embodiment, panorama viewer 120 can be a standalone application, or it can be executed within a browser 115, such as Mozilla Firefox or Microsoft Internet Explorer. Panorama viewer 120, for example, can be executed as a script within browser 115, as a plug-in within browser 115, or as a program which executes within a browser plug-in, such as the Adobe (Macromedia) Flash plug-in. In an embodiment, panorama viewer 120 is integrated with a mapping service, such as the one described in U.S. Pat. No. 7,158,878, "DIGITAL MAPPING SYSTEM", which is incorporated by reference in its entirety herein.

Figure 2:
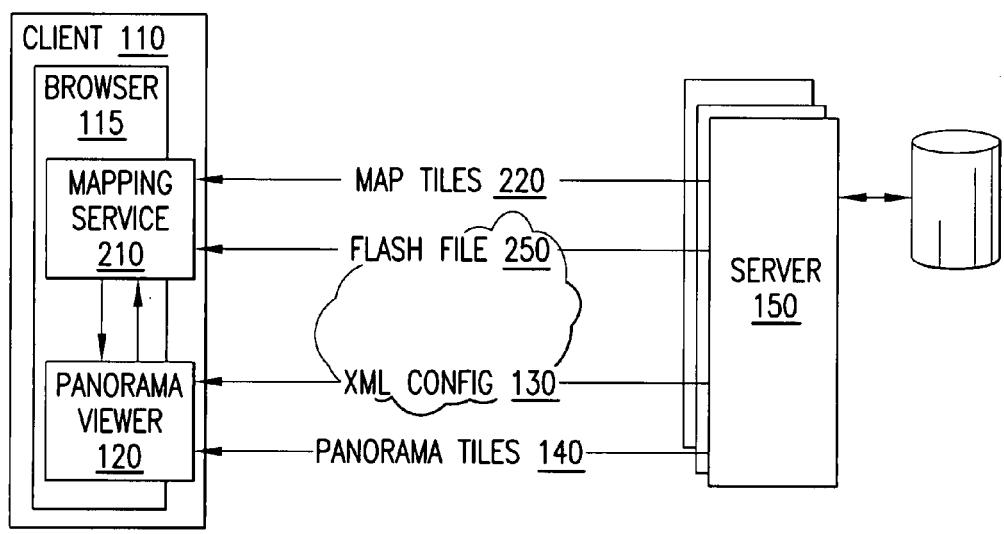
FIG. 2 is a diagram illustrating an example of how a mapping service can be integrated with a panorama viewer, in accordance with an embodiment.

FIG. 2 illustrates an example of how a mapping service 210 can be integrated with panorama viewer 120. Mapping service 210 displays a visual representation of a map, e.g., as a viewport into a grid of map tiles. Mapping system 210 is implemented using a combination of markup and scripting elements, e.g., using HTML and Javascript. As the viewport is moved, mapping service 210 requests additional map tiles 220 from server(s) 150, assuming the requested map tiles have not already been cached in local cache memory. Notably, the server(s) which serve map tiles 220 can be the same or different server(s) from the server(s) which serve panorama tiles 140 or the other data involved herein.

In an embodiment, mapping service 210 can request that browser 115 proceed to download a program 250 for panorama viewer 120 from server(s) 150 and to instantiate any plug-in necessary to run program 250. Program 250 may be a Flash file or some other form of executable content. Panorama viewer 120 executes and operates as described above. Alternatively, configuration information 130 and even panorama tiles 140 can be retrieved by mapping service 210 and passed to panorama viewer 120. Panorama viewer 120 and mapping service 210 communicate so as to coordinate the operation of the user interface elements, to allow the user to interact with either panorama viewer 120 or mapping service 210, and to have the change in location or orientation reflected in both.

Figure 3:
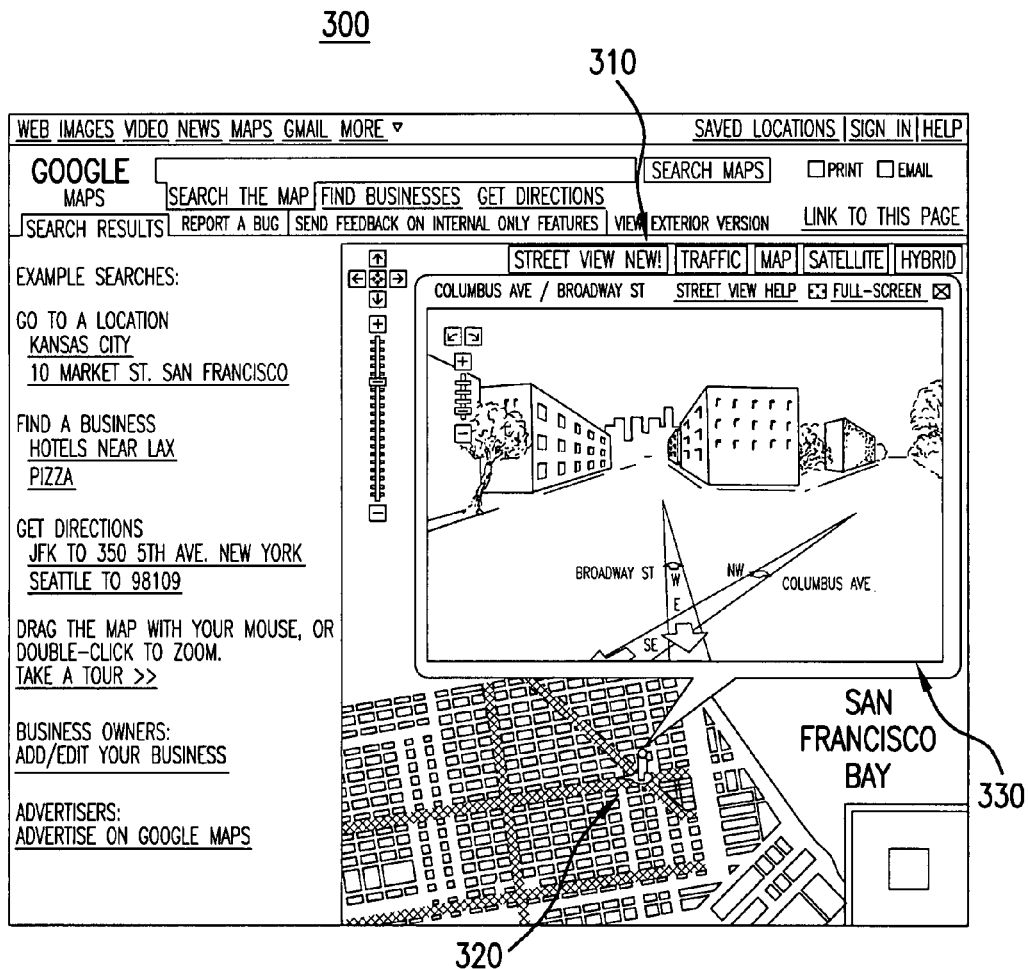
FIG. 3 depicts an example of a browser display, in accordance with an embodiment.

FIG. 3 is an example browser display 300 that presents both a mapping service such as mapping service 210 and an integrated panorama viewer such as panorama viewer 120. The mapping service provides a button 310 entitled "Street View" that, when selected, preferably changes the appearance of the map in areas where panorama data is available. For example, in FIG. 3, streets with available panorama data are highlighted. This highlighting can be, for example, a colored and/or shaded outline or overlay, or a change in color and/or shading. This can be implemented by using a transparency image with the map tile or by directly including the effect in the map tile served to the mapping service.

The mapping service allows a user to activate the panorama viewer by further selecting a point on the map. When a point is selected by the user, a character or avatar icon 320 is displayed at the point on the map. In an embodiment, the avatar icon includes an indicator of what direction the avatar icon is facing, which in FIG. 3 is represented as an arrow underneath the avatar icon.

In an embodiment, as the panorama viewer is instantiated by the mapping service, the panorama viewer is presented in the form of viewport 330 embedded in an informational balloon window associated with avatar icon 320. The orientation of the visual representation of the panorama within viewport 330 matches the orientation of avatar icon 320. As the user manipulates the visual representation of the panorama within viewport 330, the panorama viewer informs the mapping service of any changes in orientation or location so that the mapping service can update the orientation and location of avatar icon 320. Likewise, as the user manipulates the orientation or location of avatar icon 320 within the mapping service, the mapping service informs the panorama viewer so that the panorama viewer can update its visual representation.

In an embodiment, the viewport 330 of the panorama viewer presents a panoramic image of the selected area. The user can click and drag around on the image to look around 360 degrees. In the example viewport 330 depicted in FIG. 3, a variety of user interface elements are added to the underlying panorama. These elements include navigation inputs such as, for example, zoom and panning controls (e.g., navigation buttons) on the left side of the viewport and annotations in the form of lines/bars, arrows, and text that are provided directly in the panorama itself. The annotations are rendered in a three dimensional manner that roughly matches the three dimensional scene depicted in the panorama.

In FIG. 3, for example, the lines/bars in viewport 330 correspond to the streets depicted in the corresponding map and can even be rendered in the same color as the streets depicted in the map. The arrows are selectable by a user (by clicking or by dragging along the street line), one going in each direction that there is another panorama available. These allow the user to navigate up and down the street (i.e., to change the vantage point from which the street is viewed). As the user looks around 360 degrees, the lines and arrows smoothly track the underlying imagery so that the lines remain on top of the underlying streets, and so that the arrows are always visible on the screen. This allows the user to navigate along the street while looking straight ahead, or while looking to the side of the storefront.

When the user clicks on an arrow to navigate within the viewport, a zooming cross-fade effect and other visual cues give the user a sense of movement. When the user arrives at an intersection of two streets, there is one green line and two arrows for each street. All of these are visible at the same time, and all are labeled, so that the user knows the current location and can proceed in any direction. This technique can readily scale to accommodate complex intersections with more than four directions. When the user reaches a "dead end" where the road continues but no further imagery is available, there is only one arrow on the street indicating the direction in which the user can navigate. In the other direction, a symbol and message embedded in the image can be presented to inform the user that imagery is not available in this direction.

The user interface is not restricted to navigating along a line to walk down a street and can be readily extended to allow users to stray from the line elements when useful: for example, to cross over to the opposite side of the street to get a closer look at something. Moreover, there are environments within a city where a user might be expected to desire to snap off of a street and navigate freely within an adjacent area, for example, a park, plaza, shopping area, or other pedestrian-friendly public place. The interface can be readily enhanced with "free movement zones" to provide this functionality. It should also be noted that although the user interface is presented in the context of navigation between discrete street-level panoramas, it could equally well be used to allow a user to navigate through a more continuous set of panoramic data, such that navigating along a street would be as smooth as video.

The operation and implementation of the user interface elements are described in further detail below.

Figure 4:
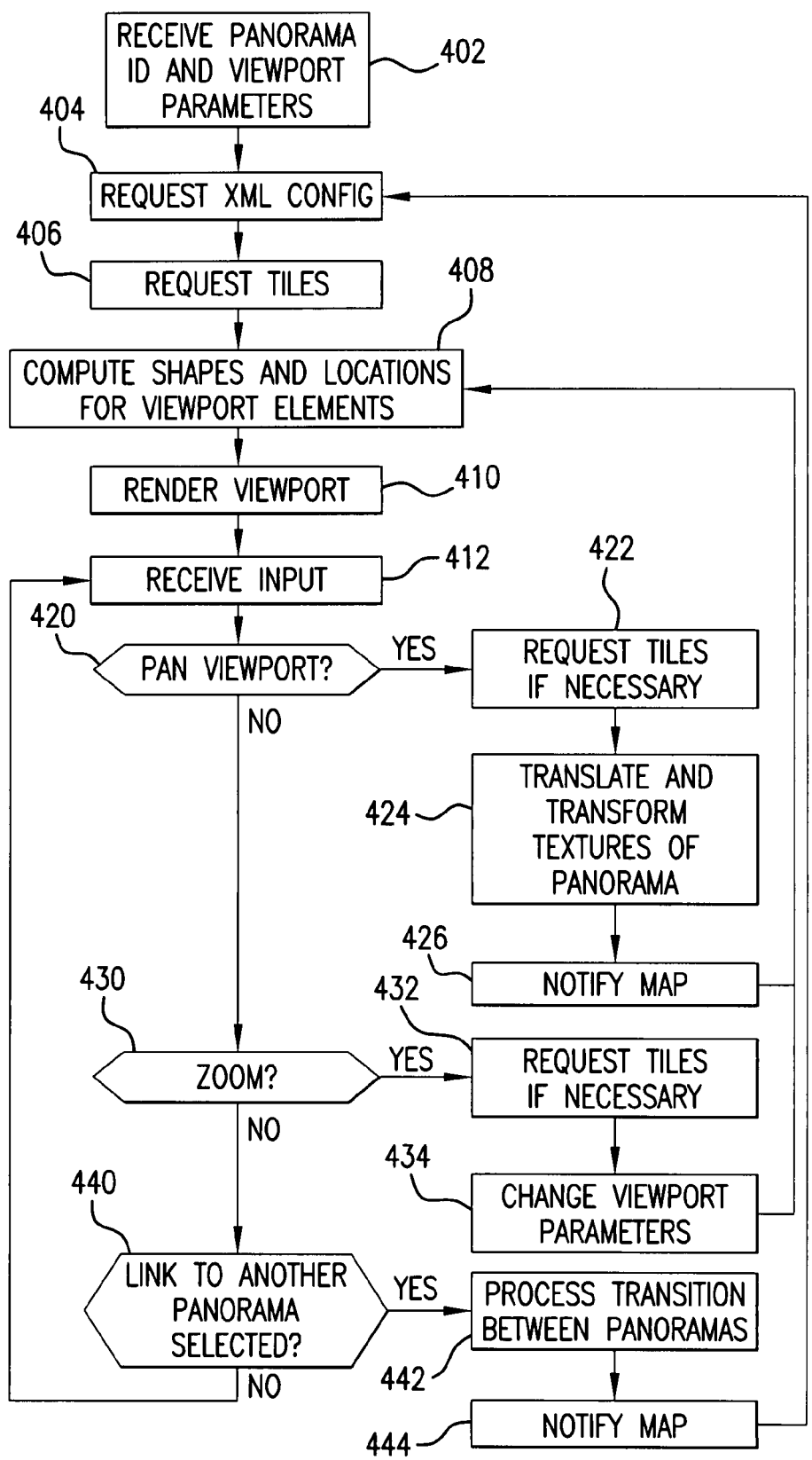
FIG. 4 is a flowchart illustrating exemplary processing performed by a panorama viewer, in accordance with an embodiment.

FIG. 4 is an exemplary flowchart of processing performed by a panorama viewer such as, for example, panorama viewer 120, in accordance with an embodiment of the invention.

At step 402, the panorama viewer receives an identifier for the initial panorama to be presented and various viewport parameters, such as the size of the viewport and the orientation to be viewed within the panorama. This information can be passed to the panorama viewer from a mapping service, e.g., by using Flashvars or ExternalInterface between the Flash plug-in and the Javascript in the mapping service.

At step 404, the panorama viewer uses the panorama identifier to request configuration information from the server (e.g., an XML file). FIG. 5 depicts exemplary XML configuration information 500 and is discussed in further detail below. The XML is parsed, and the information is loaded into various data structures for use by the panorama viewer. In an embodiment, the XML includes information for the panorama viewer such as data properties and projection properties of the current panorama, and information on annotations/links within the panorama, including links to other panoramas.

At step 406, the panorama viewer requests the visual assets for the panorama and stores the received visual assets, for example, in local memory/storage. In an embodiment, the panorama viewer can maintain a cache of visual assets and limit bandwidth usage to retrieval of visual assets which are not in the cache. FIG. 6 illustrates an example of an initial panoramic image 600. The complete panoramic image 600 can be retrieved by the panorama viewer, or panoramic image 600 can be divided into multiple panorama image tiles and the tiles requested only as needed by the panorama viewer.

At step 408, the panorama viewer processes the configuration information and the visual assets to prepare for rendering the visual representation of the panorama in the viewport at step 410. With regard to the visual assets, the panorama viewer can assemble the panorama image tiles into the portion of the complete panoramic image which overlaps with the viewport. The panorama viewer can present the panoramic image as a flat surface or as a texture-mapped three dimensional surface such as, for example, a cylinder or a sphere, as further discussed herein. With regard to the annotations overlay presented in the viewport, the panorama viewer uses the configuration information to compute the shapes and locations for these various elements such as, for example, the lines/bars and the arrows presented in the viewport.

In an embodiment, the polygons/shapes are modeled in a three-dimensional space that corresponds to the space depicted in the panorama. These polygons/shapes can be modeled, for example, using a pinhole camera model (e.g., the focal length can be generated by multiplying the height of the viewport by a constant relative depth of the center of rotation). The polygons/shapes of the annotations overlay change their orientation in the three-dimensional space in a manner that matches the change in orientation of the viewport. In one embodiment, the polygons/shapes are rotated by an angle equal to the difference between the current orientation of the user's point-of-view in the panorama and the direction of the annotation, as specified in the configuration information. The polygons/shapes can be further transformed around different spatial axes in order to take into account non-flat panoramas, as further described herein.

At step 410, the visual representation of the panorama in the viewport is rendered.

At step 412, the panorama viewer receives and manages input, for example, by capturing input events such as mouse and keyboard events. The panorama viewer, for example, detects whether the user has panned the viewport (e.g., by dragging the mouse or by selecting a pan control button), has selected to zoom (e.g., by clicking on the panorama or by moving the zoom slider control on the left of the viewport with the mouse) or has selected a link to another panorama (e.g., by clicking on an arrow with the mouse).

At step 420, a determination is made regarding whether a user has panned the viewport. If the user has panned the viewport, control transfers to step 422. If the user has not panned the viewport, control transfers to step 430.

At step 422, the panorama viewer determines whether the viewport will overlap with any panorama image tiles which will need to be retrieved from either the server or a cache.

At step 424, the panorama viewer executes the necessary computations for allowing the viewport correctly to be rendered in a different orientation, as further described in detail herein.

At step 426, the panorama viewer notifies the mapping service of the new orientation selected by the user so that the mapping service can update its avatar icon's facing indicator. The panorama viewer re-computes the shapes and locations for the viewport elements and renders the viewport. To illustrate this point, consider FIG. 7A which depicts the panorama viewer viewport from FIG. 3. FIG. 7B shows the result after a user has selected to pan the panorama to the left. Note that the lines/bars that correspond to the roads depicted in the panorama change their orientation as the panorama viewer changes the orientation of the panorama.

At step 430, a determination is made regarding whether a user has zoomed the viewport. If the user has zoomed the viewport, control transfers to step 432. If the user has not zoomed the viewport, control transfers to step 440.

At step 432, the panorama viewer determines, for example, whether to request new higher resolution panorama image tiles from a server (or from cache), or whether to utilize existing tiles at a different close-up resolution, for example, where no such higher resolution tiles exist.

At step 434, the viewport parameters are changed to reflect the different zoom level. A transition can be provided between the zoom levels so as to give the appearance of actively zooming into the next zoom level of the panorama. FIG. 7C shows the result after the user has selected to zoom in on a feature in FIG. 7A.

At step 440, a determination is made regarding whether a user has selected a link to another panorama. If the user has selected a link to another panorama, control transfers to step 442. If the user has not selected a link to another panorama, control transfers to step 412.

At step 442, the panorama viewer proceeds to begin the process of transitioning between the original panorama and the new panorama. The panorama viewer can, for example, zoom the original panorama and perform a cross-fade to the new panorama to give the user a sense of movement. Alternatively, the panorama viewer can play an actual video transition between the two panoramas.

At step 444, the panorama viewer notifies the mapping service of the new location selected by the user so that the mapping service can update its avatar icon's location and can scroll the map accordingly.

In embodiments, the panorama viewer can be implemented using any advantageous programming language or style of programming. For example, the panorama viewer can be implemented using object-oriented programming with separate classes designated to handle the XML configuration information, the annotations, the texture generation, the tile management, and the mesh generation.

FIG. 5 sets forth exemplary XML configuration information 500 (e.g., metadata). As illustrated by the example shown in FIG. 5, the schema for the configuration information is organized into "data_properties", "projection_properties", and "annotation_properties".

The subgroup Data_Properties contains attributes such as "pano_id" (e.g., a unique identifier for the panorama), "image_width" and "image_height" (e.g., dimensions of the panoramic image before being split into tiles), "tile_width" and "tile_height" (e.g., dimensions of the tiles), "lat" and "lng" (e.g., coordinates of the current panorama), and "num_zoom_levels" (e.g., the number of zoom levels that the user will be able to view in the panorama viewer). This subgroup also contains elements such as "text" (e.g., that can be used to represent the street name of the current panorama), "copyright" (e.g., copyright information), and "street_range" (e.g., the range of numbers in the given street).

The subgroup Projection properties contains attributes such as "Pano_yaw_deg" (e.g., orientation of the vehicle which captured the images which generated the panoramic image), "tilt_yaw_deg" and "tilt_pitch_deg" (e.g., the yaw and pitch of the line of highest slope which, as further described herein, is useful for dealing with panoramas with sloped features), and "vertical_scale" (e.g., fraction of the image along the y-axis that is visible at the lower zoom level).

The subgroup Annotation_properties contains attributes such as "horizon_height_fraction" (e.g., vertical position (height) of the horizon, expressed as a fraction of the visible strip, which can be adjusted to maximize the fit between the annotations and the imagery of the tiles) and "annotation_height_fraction" (e.g., vertical position (height) of the plan containing the annotations, expressed as a fraction of the visible strip). This subgroup also includes the "pano_link" subgroup which describes properties of link symbols that allow a user to navigate to a neighboring panorama or to another related document. The "link" subgroup includes "link_text" (e.g., description of the landing panorama) as an element and includes the following as attributes: "yaw_deg" (e.g., direction that the link is pointing to), "pano_id" (e.g., identifier to linked panorama), and "road_argb" (e.g., an attribute of the road, such as the color of the road on the map) (not shown). The subgroup can also include a "floating_text" group or element which identifies arbitrary features in the panorama and could also provide for an arbitrary link, for example to a local data repository or a website (not shown).

It should be noted that the above schema for the configuration information is merely illustrative and can be arranged in any of a number of advantageous ways, including using techniques that do not rely on XML.

FIG. 8 is a flowchart of processing performed by a renderer in accordance with an embodiment of the invention.

At step 802, the renderer precomputes a pre-image of a viewport by a backward transform. This defines a portion of a surface, which is referred to herein as the "precomputed region". FIG. 9A illustrates this in the context of a cylindrical surface 900 with a rectangular viewport 920, which defines a precomputed region 910 by the backward transformation. It should be noted that the viewport does not have to be rectangular and that the technique works for discretized cylinders (based on a mesh) or for continuous voxel-to-pixel mappings. For example, a mesh can be defined on the viewport with a corresponding mesh on the cylinder. These meshes do not have to be uniform, and are images of one another as defined by the forward or backward mappings. The mesh on the cylinder will typically only cover a portion of the cylinder. In the case of a continuous transformation, the pre-image of the viewport would define a continuous region of the cylinder.

At step 804, the renderer precomputes the transform, which maps each pixel from the precomputed region to a pixel in the viewport. In a sense, it is assumed that the cylinder is standing still in space. Instead of attaching a texture image to a changing cylinder, it is assumed that the texture will "slide" on the cylinder.

At step 806, the renderer translates an image/texture in response to a user input.

At step 808, the renderer determines that portion of the image/texture that intersects the precomputed region of the surface. This defines the set of pixels that need to be rendered in the viewport. If the user has changed the point of view recently, then this needs to be updated. More precisely, any panning to the left or right of the viewport can be readily achieved by translating the texture in the corresponding direction, at step 806, thereby generating a different intersection with the precomputed region. Likewise, any panning up or down is achieved by translating the texture along these directions. Any arbitrary direction of panning is achieved by simply translating the texture in the corresponding direction. Each time, a new intersection with the precomputed region is generated. This is illustrated in FIGS. 9B and 9C, where 950 represents the precomputed region and 960 represents the image/texture.

At step 810, the precomputed transform is applied to the portion of image/texture that intersects with the precomputed region.

Finally, at step 812, the transformed imagery is rendered into the viewport.

In an embodiment, the renderer utilizes properties of rectilinear projections to speed up the rendering of the panoramic images. If a surface like a cylinder is viewed as infinite, then it is a group endowed G with the natural operations (e.g., translation along axis, and rotation around axis). Likewise, the texture, if viewed as infinite, is also a group H endowed with translations in the plane. It turns out that there is a canonical homomorphism between G and H. In other words, a rotation of the cylinder around its axis is equivalent to a translation of the texture, for example, in the x-direction. A translation of the cylinder along its axis is equivalent to a translation of the texture, for example, in the y-direction. This allows one to pre-compute all projection parameters in advance and to simulate a change of viewpoint as a translation of the texture. FIGS. 10A and 10B illustrate an example of how to compute projection parameters from the screen space to the texture space. As illustrated by FIGS. 10A and 10B:

(1) If a point M on screen 1020 has coordinates (x, y), then in space it has coordinates (x, y, R), where R is the radius of the cylinder 1010.

(2) In this case, $$\tan\theta = \frac{x}{R},$$

and the point P has, in the texture space, the following coordinates: $P = \begin{pmatrix} \arctan\left(\frac{x}{R}\right) \\ \frac{Ry}{\sqrt{x^2 + R^2}} \end{pmatrix}.$ A dynamic texture based on the current zoom level can be generated and positioned in the image space. This texture changes when the user changes the point-of-view (e.g., by zooming or panning). This texture can be obtained by concatenating tiles from a tile pyramid at the appropriate level and scale. If some tiles are missing, one can fall back on a tile at a parent level in the tile pyramid. The texture is modeled as being mapped over a cylinder. A projection is performed over the screen space. This nonlinear projection can be approximated as a piecewise affine transformation. More precisely, the cylinder and screen spaces can be discretized using a triangular mesh. Each triangle can be rendered by linearly (or rather, affinely) mapping a piece of the texture over it. This is well-defined as an affine transform in the two dimensional plane since it is uniquely determined by its action on three points (hence, the use of triangles). The mesh can be made uniform in the screen space (and not in the texture space). The screen mesh is always the same regardless of the zoom level. Different texture meshes can be used depending on the zoom level. For each triangle, a texture mesh corresponds to a unique triangle in the screen mesh and a unique (affine) transformation matrix. Such a matrix can be pre-computed as the product of a screen matrix and (the inverse of) a texture matrix.

When a user pans, all the renderer needs to do is adjust and/or refresh the texture. This is fast, because it consists of memory copies. Copying large chunks of pixels is usually highly optimized in several programming languages.

In an embodiment, zooming in consists of dividing both horizontal and vertical fields of vision by two and using the next zoom level to generate the texture. When the user zooms in/out, the panorama viewer can pre-cache a few bitmap images to make the animation smooth. As far as the projection itself, one can use the various sets of transformation matrices at integral zoom levels. At non-integral zoom levels, one can linearly interpolate the transformation matrices (still fast) between the previous zoom level and the next one.

In a case where pixels are assumed to be square, they correspond to homogeneous solid angles. The elementary field of vision of a given pixel is the same in the horizontal and the vertical directions. This enables a trade-off to be made. For example, one can choose exactly to preserve straight lines, but this will result in higher distortion on the side. Alternatively, one can decide to have straight lines become a bit curvy, and thereby reduce the amount of distortion. In an embodiment, the height of the original image is scaled to that of the viewport. Because the pixels are square, the ratio of the width over height of the viewport determines the horizontal field of vision.

In the case of a sphere rather than a cylinder, the assumptions above are no longer true. Accordingly, the above technique alone cannot simulate a true pan up/down, because all that is performed is a move along the cylinder's axis with the vision vector perpendicular to this axis. Nevertheless, the motion of a true pan up/down can be simulated by pre-computing a series of transforms and linearly interpolating between the transforms.

In an embodiment, the panorama viewer is configured to handle non-flat panoramas. Not all panoramas depict flat and horizontal features, e.g., consider many of the streets of San Francisco. Cameras mounted on a vehicle, for example, used to capture panoramas are parallel to the ground. Thus, traveling on a steep incline can result in misoriented pictures. Accordingly, in such situations, it can be advantageous to warp the panorama so as to ensure that vertical buildings in the real world remain vertical in the texture space. FIG. 11 depicts an example of how a panorama 1100 can be so warped. As illustrated by FIG. 12, the example roughly follows a periodic function which can be used to guide the placement of the viewport as well as the generation of the annotations in a manner that takes the slope of the panorama into account.

As noted herein, the configuration information can include projection properties such as the yaw and the pitch of the highest slope in the panorama. As illustrated by FIG. 12, the panorama viewer can use the yaw and pitch of the direction of the steepest slope to constrain the viewport to the sinusoidal strip of the warped panorama. The rendering of the annotation elements in the viewport also can be modified to take into account the yaw and pitch information of the slope of the panorama. The spatial orientation of the lines/bars and arrows can be transformed based on the yaw and pitch information or, alternatively, can be estimated based on the relative yaw of the annotation and the yaw of the steepest slope. FIG. 13 illustrates the result of such processing of configuration information on the slope of a panorama. The panorama correctly places the vertical buildings in the panoramic image on the steeply-sloped street. Moreover, the line/bar (e.g., street line metadata) depicting the road is tilted at an angle which roughly matches the slope of the street.

In an embodiment, the panorama viewer also is able to facilitate user annotations to a panorama image. User annotations to panoramas represent a challenge with respect to how to reference an annotation in three-dimensional space.

FIGS. 14 and 15 illustrate an embodiment which addresses user annotations in three-dimensional space. The processing illustrated in FIG. 15 can occur at the panorama viewer (or the mapping service), at the server, or a combination of the two.

Referring to FIG. 15, at step 1502, a user inputs an annotation with respect to one panorama. The panorama viewer can receive the user input in any of a number of different ways, including by receiving a click event on the spot on the panorama which the user desires to annotate. The two-dimensional location of the annotation on the panorama is recorded in some advantageous coordinate system, e.g., by location on the panorama image or by yaw and pitch coordinates.

At step 1504, the user navigates to another nearby panorama in the panorama viewer, locates the same feature to be annotated, and again inputs an annotation with respect to the second panorama. The panorama viewer or the mapping service can presumably also offer the ability to add additional metadata associated with the annotation, such as a title, link, graphics, etc.

At step 1506, the annotations coordinates on the two panoramas are used to generate three-dimensional coordinates for the annotation. Given the known position of the cameras which took the images for the panorama 1410, 1420 and the user-input annotation coordinates relative to the two-dimensional images, as illustrated in FIG. 14, it is possible to compute the intersection of the two, depicted as 1450. The result is a three-dimensional coordinate for the annotation.

At step 1508, the three-dimensional coordinate for the annotation is assigned to the annotation and stored in the database of annotations. The annotation can then be included with any panorama within some advantageous range of the computed coordinates, including panoramas which were not originally annotated by the user.

Alternatively, where the relative pitch information is not particularly important to an annotation, it is possible to receive the user annotations as a one-dimensional yaw direction on both panoramas, which facilitates the assignment of a two-dimensional geocode to the annotation (with or without default pitch information).

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for processing annotations to panoramas, comprising:
    (a) receiving a first user annotation for a feature in a first panorama, wherein the first panorama is associated with a first latitude and longitude coordinate, the first latitude and longitude coordinate representing a first location on the Earth;
    (b) recording a first two-dimensional location for the first user annotation, the first two-dimensional location representing a selected location on the first panorama, wherein the first two-dimensional location includes a first pitch and a first yaw;
    (c) receiving a second user annotation for said feature in a second panorama, wherein the second panorama is associated with a second latitude and longitude coordinate, the second latitude and longitude coordinate representing a second location on the Earth, and wherein the second user annotation is received after a user has navigated to the second panorama and located said feature, the second user annotation further comprising a metadata;
    (d) recording a second two-dimensional location for the second user annotation, the second two-dimensional location representing a selected location on the second panorama, wherein the second two-dimensional location includes a second pitch and a second yaw;
    (e) determining a three-dimensional coordinate of an annotation representing said feature, wherein the three-dimensional coordinate is based on an intersection between a first ray from the first latitude and longitude coordinate in a direction of the first two-dimensional location and a second ray from the second latitude and longitude coordinate in a direction of the second two-dimensional location; and
    (f) storing the three-dimensional coordinate in association with the annotation representing said feature.

2. The method of claim 1, further comprising (g) rendering the annotation representing said feature within a third panorama including projecting the annotation representing said feature on the third panorama according to the three-dimensional coordinate.

3. The method of claim 1, wherein the metadata further comprises at least one of a title, a link, or a graphic.

4. A system for processing annotations of panoramas, comprising:
    a server that:
        receives a first user annotation for a feature in a first panorama, wherein the first panorama is associated with a first latitude and longitude coordinate, the first latitude and longitude coordinate representing a first location on the Earth,
        records a first two-dimensional location for the first user annotation, the first two-dimensional location representing a selected location on the first panorama, wherein the first two-dimensional location includes a first pitch, and a first yaw,
        receives a second user annotation for said feature in a second panorama, wherein the second panorama is associated with a second latitude and longitude coordinate, the second latitude and longitude coordinate representing a second location on the Earth, and wherein the second user annotation is received after a user has navigated to the second panorama and located said feature, the second user annotation further comprising a metadata,
        records a second two-dimensional location for the second user annotation, the second two-dimensional location representing a selected location on the second panorama, and wherein the second two-dimensional location includes a second pitch, and a second yaw,
        determines a three-dimensional coordinate of an annotation representing said feature, wherein the three-dimensional coordinate is based on an intersection between a first ray from the first latitude and longitude coordinate in a direction of the first two-dimensional location and a second ray from the second latitude and longitude coordinate in a direction of the second two-dimensional location, and
        stores the three-dimensional coordinate in association with the annotation representing said feature.

5. The system of claim 4, further comprising a panorama viewer that renders the annotation representing said feature within a third panorama and projected on the third panorama according to the three-dimensional coordinate.

6. The system of claim 4, wherein the metadata further comprises at least one of a title, a link, or a graphic.

* * * * *